US011377375B2

(12) United States Patent
Choi et al.

(10) Patent No.: US 11,377,375 B2
(45) Date of Patent: Jul. 5, 2022

(54) CAPACITIVE DEIONIZATION ELECTRODE MODULE AND WATER TREATMENT APPARATUS AND METHOD CAPABLE OF SAVING ENERGY USING THE SAME

(71) Applicant: DOOSAN HEAVY INDUSTRIES & CONSTRUCTION CO., LTD., Changwon-si (KR)

(72) Inventors: Hyunsung Choi, Busan (KR); Seongju Kim, Jinju-si (KR); Jangyong You, Suwon-si (KR); Seokho Choi, Anyang-si (KR); Jaedong Hwang, Yongin-si (KR)

(73) Assignee: Doosan Heavy Industries & Construction Co., Ltd, Changwon-si (KR)

( * ) Notice: Subject to any disclaimer, the term of this patent is extended or adjusted under 35 U.S.C. 154(b) by 353 days.

(21) Appl. No.: 15/622,789

(22) Filed: Jun. 14, 2017

(65) Prior Publication Data
US 2018/0037478 A1    Feb. 8, 2018

(30) Foreign Application Priority Data

Aug. 5, 2016  (KR) .................. 10-2016-0100046
Aug. 5, 2016  (KR) .................. 10-2016-0100047

(51) Int. Cl.
*C02F 1/469* (2006.01)
*H01G 11/26* (2013.01)
(Continued)

(52) U.S. Cl.
CPC .......... *C02F 1/4691* (2013.01); *H01G 11/26* (2013.01); *H01G 11/32* (2013.01); *H01G 11/78* (2013.01);
(Continued)

(58) Field of Classification Search
CPC .................................................. C02F 1/4691
See application file for complete search history.

(56) References Cited

U.S. PATENT DOCUMENTS

| 10,071,922 B2* | 9/2018 | Choi et al. ............. C02F 1/4691 |
| 2002/0167782 A1* | 11/2002 | Andelman ............. C02F 1/4691 361/302 |

(Continued)

FOREIGN PATENT DOCUMENTS

| EP | 3045431 A1 * | 7/2016 | ............ C02F 1/4691 |
| JP | 2003-508192 A | 3/2003 | |

(Continued)

OTHER PUBLICATIONS

Extended European Search Report dated Nov. 6, 2017 in European Application No. 17176760.1.
(Continued)

*Primary Examiner* — Salil Jain
(74) *Attorney, Agent, or Firm* — Invenstone Patent, LLC (57) ABSTRACT

The present invention relates to a capacitive deionization electrode module, a water treatment apparatus and method capable of saving energy using the same, and more particularly, to a capacitive deionization electrode module that is capable of improving durability, suppressing fouling, and increasing the amount of incoming water treated and to a water treatment apparatus and method that is capable of recovering and reusing energy generated while a saline adsorbed to the capacitive deionization electrode module is being desorbed through an energy recovery device, thereby saving the energy.

5 Claims, 8 Drawing Sheets

(51) Int. Cl.
*H01G 11/32* (2013.01)
*H01G 11/78* (2013.01)
*C02F 1/461* (2006.01)

(52) U.S. Cl.
CPC .............................. *C02F 1/46109* (2013.01); *C02F 2001/46138* (2013.01); *C02F 2001/46152* (2013.01); *C02F 2201/4613* (2013.01); *C02F 2201/4617* (2013.01); *C02F 2201/46115* (2013.01); *C02F 2303/10* (2013.01); *Y02W 10/30* (2015.05)

(56) References Cited

U.S. PATENT DOCUMENTS

| | | | | |
|---|---|---|---|---|
| 2008/0198531 A1* | 8/2008 | Shiue | .................... | C02F 1/4691 |
| | | | | 361/434 |
| 2009/0255815 A1* | 10/2009 | Shiue | .................... | C02F 1/4691 |
| | | | | 204/665 |
| 2011/0240474 A1* | 10/2011 | Seed | .................... | C02F 1/46114 |
| | | | | 204/660 |
| 2014/0246318 A1* | 9/2014 | Yang et al. | ........... | C02F 1/4695 |
| 2016/0130161 A1* | 5/2016 | Eaton | .................... | C02F 1/4604 |
| | | | | 205/759 |

FOREIGN PATENT DOCUMENTS

| | | | |
|---|---|---|---|
| KR | 10-2003-0071229 | A | 9/2003 |
| KR | 10-0521628 | B1 | 10/2005 |
| KR | 10-2009-0096097 | A | 9/2009 |
| KR | 10-0934161 | B1 | 12/2009 |
| KR | 100973669 | B1 * | 8/2010 |
| KR | 10-2012-0101353 | A | 9/2012 |
| KR | 10-1299735 | B1 | 8/2013 |
| KR | 10-2014-0148147 | A | 12/2014 |
| KR | 10-2015-0065300 | A | 6/2015 |
| KR | 10-2015-0081009 | A | 7/2015 |
| KR | 10-2015-0106747 | A | 9/2015 |
| KR | 10-1591257 | B1 | 2/2016 |
| KR | 10-2016-0074189 | A | 6/2016 |
| WO | WO-2001/15792 | A1 | 3/2001 |
| WO | WO-02/086195 | A1 | 10/2002 |
| WO | WO-2010/069065 | A1 | 6/2010 |
| WO | WO-2011/041013 | A1 | 4/2011 |
| WO | WO-2012/129532 | A1 | 9/2012 |

OTHER PUBLICATIONS

Office Action dated Dec. 5, 2017 in Korean Application No. 10-2016-0100046.

Office Action dated Oct. 17, 2017 in Korean Application No. 10-2016-0100047.

Office Action dated Apr. 12, 2018 in Korean Application No. 10-2016-0100047.

* cited by examiner

CAPACITIVE DEIONIZATION ELECTRODE MODULE AND WATER TREATMENT APPARATUS AND METHOD CAPABLE OF SAVING ENERGY USING THE SAME

CROSS-REFERENCE TO RELATED APPLICATIONS

This application claims priority to Korean Patent Application Nos, 10-2016-0100046 and 10-2016-0100047, filed on Aug. 5, 2016, the disclosures of which are incorporated herein by reference in their entirety.

BACKGROUND OF THE INVENTION

Field of the Invention

The present invention relates to a capacitive deionization electrode module, a water treatment apparatus and method capable of saving energy using the same, and more particularly, to a capacitive deionization electrode module that is capable of improving durability, suppressing fouling, and increasing the amount of incoming water treated and to a water treatment apparatus and method that is capable of recovering and reusing energy generated while a saline adsorbed to the capacitive deionization electrode module is being desorbed through an energy recovery device, thereby saving the energy.

Background of the Related Art

Capacitive deionization (CDI) is a technology for removing ionic materials from raw water through ion adsorption and desorption reactions at an electrical double layer (EDL) formed on the charged electrode interface. In more detail, if a voltage is applied within the range of potential where no electrolysis of water occurs, a given quantity of electric charge is charged to electrodes, and if brine having ions passes through the charged electrodes, the ions having the opposite charge to the charged electrodes are moved to the electrodes by means of electrostatic forces and then adsorbed to the surfaces of the electrodes, so that the water passing through the electrodes becomes desalinated water from which the ions are removed.

At this time, the amount of ions adsorbed to the electrodes depends upon the capacitance of the electrodes used, and accordingly, the electrodes used for the CDI generally make use of porous carbon electrodes having large specific surface areas.

If the capacity of ions adsorbed to the electrodes is saturated, on the other hand, the ions cannot be adsorbed anymore, so that the ions in the incoming water are just discharged as outgoing water. So as to desorb the ions adsorbed to the electrodes, at this time, if the electrodes are short-circuited or the opposite potentials to the adsorbed potentials are applied to the electrodes, the electrodes lose their charge or have the opposite charge, and the adsorbed ions are rapidly desorbed, thereby achieving the regeneration of the electrodes.

According to the CDI technology, only the potentials of the electrodes are changed to conduct the adsorption and desorption processes, thereby making the operation very simple and ensuring an eco-friendly desalination process wherein no environmental pollutants in the desalination process is discharged.

Membrane capacitive deionization (MCDI) as an improvement of the CDI is a technology for enhancing the selectivity of ions adsorbed through the formation of ion exchange membranes on the surfaces of electrodes. However, the MCDI makes use of high-priced ion exchange membranes, thereby raising the whole capital expenditures.

In case of the conventional CDI or MCDI, further, a flow path is generally designed narrow to a range of 100 μm so as to increase a saline removal efficiency. In this case, however, fouling may be likely to occur due to the narrow flow path and the amount of incoming water treated may be decreased to reduce the productivity. Due to the narrow flow path, in addition, it is difficult to manufacture a large area CDI electrode module with a serial structure, which causes limitations in enhancing the productivity.

Also, the conventional CDI electrode modules make use of square-shaped electrodes, and in this case, no deionization occurs on the edges of the square-shaped electrodes. Besides, corrosion occurs on the edges of the square-shaped electrodes, thereby undesirably lowering the deionization efficiency.

Further, there is no method for recovering the energy consumed in the adsorption and desorption processes of the conventional CDI electrode modules, thereby undesirably causing high energy consumption cost.

Accordingly, there is a definite need for the development of a new CDI electrode module capable of suppressing fouling, increasing the amount of incoming water treated, and improving the removal efficiency of ionic materials and for the development of a technology capable of recovering and reusing the energy consumed in the operation of a CDI electrode module.

SUMMARY OF THE INVENTION

Accordingly, the present invention has been made in view of the above-mentioned problems occurring in the prior art, and embodiments of the present invention provide a capacitive deionization electrode module that is capable of improving durability, suppressing fouling, and increasing the amount of incoming water treated and provide a water treatment apparatus and method that is capable of recovering and reusing the energy generated while the saline adsorbed to a capacitive deionization electrode module is being desorbed through an energy recovery device, thereby saving the energy.

According to a first aspect of the present invention, a capacitive deionization electrode module comprises: a cylindrical housing having a hole formed at the center thereof; a pair of circular electrodes disposed inside the cylindrical housing and having a hole formed at the center thereof; and circular intermediate electrodes spaced apart from each other by a given distance between the pair of circular electrodes and each having a hole formed at the center thereof, wherein the circular electrodes and the circular intermediate electrodes have a diameter in a range of 30 cm to 40 cm.

According to the present invention, desirably, the pair of circular electrodes has active carbon layers formed on surfaces facing each other, and each of the circular intermediate electrodes has active carbon layers formed on both surfaces thereof.

According to the present invention, desirably, the pair of circular electrodes is connected to a DC power supply so that a cathode is formed on one side thereof and an anode is formed on the other side thereof, each of the circular intermediate electrodes has a cathode formed on one surface thereof and an anode formed on the other surface thereof, and the number of the circular intermediate electrodes is plural.

According to the present invention, desirably, cation exchange resins and anion exchange resins are filled in a flow path between the electrodes and have concentration gradients opposite to each other, so that a relatively large number of the cation exchange resins are distributed to the anodes and a relatively large number of the anion exchange resins are distributed to the cathodes, and desirably, the cation exchange resins and the anion exchange resins are evenly distributed in the center of the flow path.

According to a second aspect of the present invention, a water treatment apparatus comprises: a DC power supply adapted to apply a voltage to a capacitive deionization electrode module; the capacitive deionization electrode module adapted to adsorb ions of incoming water thereto; and an energy recovery device adapted to recover energy generated when the ions adsorbed to the capacitive deionization electrode module are desorbed.

According to the present invention, desirably, the energy recovery device includes: a breaker adapted to change a direction of an electric current flowing in the capacitive deionization electrode module; a converter adapted to recover the energy generated while a saline adsorbed to the capacitive deionization electrode module is being desorbed; and a capacitor adapted to store the recovered energy.

According to the present invention, desirably, two capacitive deionization electrode modules are operated as one set, and one energy recovery device is shared by the one set of capacitive deionization electrode modules, so that the energy generated during the desorption process of one side capacitive deionization electrode module is recovered and stored, and the stored energy is used for the adsorption process of the other side capacitive deionization electrode module.

According to the present invention, desirably, the capacitive deionization electrode module includes: a cylindrical housing having a hole formed at the center thereof; a pair of circular electrodes disposed inside the cylindrical housing and having a hole formed at the center thereof; and circular intermediate electrodes spaced apart from each other by a given distance between the pair of circular electrodes and each having a hole formed at the center thereof, wherein the circular electrodes and the circular intermediate electrodes have a diameter in a range of 30 cm to 40 cm.

According to the present invention, desirably, the pair of circular electrodes has active carbon layers formed on surfaces facing each other, and each of the circular intermediate electrodes has active carbon layers formed on both surfaces thereof.

According to the present invention, desirably, the pair of circular electrodes is connected to a DC power supply so that a cathode is formed on one side thereof and an anode is formed on the other side thereof, each of the circular intermediate electrodes has a cathode formed on one surface thereof and an anode formed on the other surface thereof, and the number of the circular intermediate electrodes is plural.

According to the present invention, desirably, cation exchange resins and anion exchange resins are filled in a flow path between the electrodes and have concentration gradients opposite to each other, so that a relatively large number of the cation exchange resins are distributed to the anodes and a relatively large number of the anion exchange resins are distributed to the cathodes, and desirably, the cation exchange resins and the anion exchange resins are evenly distributed in the center of the flow path.

According to a third aspect of the present invention, a water treatment method comprises: applying a voltage to a capacitive deionization electrode module; causing ions of incoming water to adsorb to the capacitive deionization electrode module; and recovering energy generated when the ions adsorbed to the capacitive deionization electrode module are desorbed.

According to a method of the present invention, desirably, the recovery of energy includes: changing a direction of an electric current flowing in the capacitive deionization electrode module; recovering the energy generated while a saline adsorbed to the capacitive deionization electrode module is being desorbed and transferring the recovered energy to a capacitor; and storing the recovered energy in the capacitor.

BRIEF DESCRIPTION OF TRE DRAWINGS

The above and other features of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a capacitive deionization electrode module, a water treatment apparatus and method capable of saving energy using the same according to the present invention will be given in detail with reference to the accompanying drawing. Before the description, the terms or terminology used in the description and claims of the present invention are for the purpose of describing particular embodiments only and are not intended to be limiting.

In the description, when it is said that one member is located "above" or "under" another member, it means that one member may come into contact with another member as well as yet another member may exist between the two members.

In the description, when it is said that one element or portion is described as "includes" any component, one element or portion further may include other components unless no specific description is suggested.

Identification symbols on steps are used for the convenience of the description, and they do not mean the order of the steps. The steps may be differently carried out from the described order unless a specific order is described. That is, the steps may be carried out in the same or a different order as described, carried out at the same time, or carried out in the opposite order to that described.

The present invention is disclosed with reference to the accompanying drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

In the description of the components of the embodiment of the present invention, further, terms, such as the first, the second, A, B, (a), (b) and so on may be used to describe various elements, but the elements should not be restricted by the terms. The terms are used to only distinguish one element from the other element. Accordingly, the inherence, sequence or order of the corresponding element is not restricted by the terms.

When it is said that one element is described as being "connected" or "coupled" to another element, one element may be directly connected or coupled to another element, but it should be understood that yet another element may be "connected" or "coupled" between the two elements.

Figure 1:
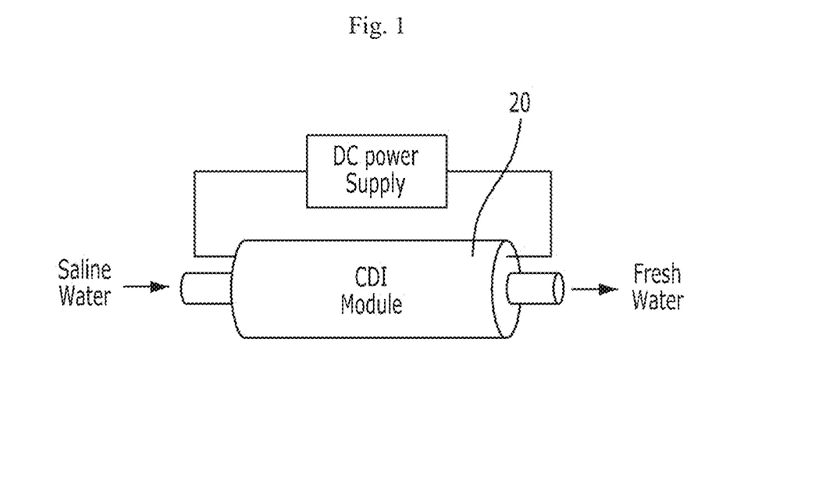
FIG. 1 is a schematic diagram showing a capacitive deionization electrode module according to the present invention.
Figure 2:
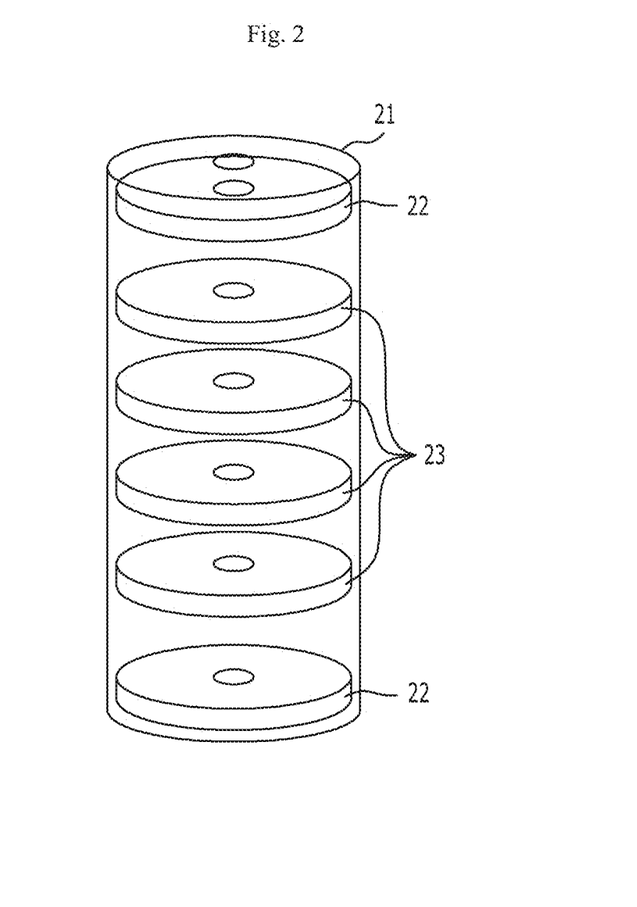
FIG. 2 is a schematic view showing the interior of FIG. 1.

FIG. 1 is a schematic diagram showing a capacitive deionization electrode module according to the present invention, and FIG. 2 is a schematic view showing the interior of FIG. 1. As shown in FIGS. 1 and 2, a capacitive deionization electrode module (hereinafter, referred simply to as 'CDI electrode module') 20 according to the present invention includes: a cylindrical housing 21 having a hole formed at the center thereof; a pair of circular electrodes 22 having a hole formed at the center thereof; and circular intermediate electrodes 23 spaced apart from each other by a given distance between the pair of circular electrodes 22 and each having a hole formed at the center thereof. So as to improve the capacity of incoming water treated, at this time, the circular electrodes 22 disposed inside the housing 21 and the intermediate electrodes 23 disposed between the circular electrodes 22 desirably have a diameter in a range of 30 cm to 40 cm.

Most of conventional CDI electrode modules have square-shaped electrodes, and the sizes of the electrodes generally have 10 cm×10 cm. In this case, the capacity of incoming water treated is just 2.5 ton/day. Further, no deionization occurs on the edges of the square-shaped electrodes, and furthermore, corrosion (oxidation of electrodes) occurs thereon to lower the deionization efficiency. According to the present invention, however, the CDI electrode module makes use of the circular electrodes having a diameter of 30 cm to 40 cm, so that it is easy to laminate the electrodes, deionization occurs evenly on the entire electrode to improve the deionization efficiency per unit area, and the capacity of incoming water treated is more increased by 10 times than that of the conventional CDI electrode module having the square-shaped electrodes. Further, the occurrence of oxidation on the edges of the square-shaped electrodes is inhibited, thereby improving the durability of the CDI electrode module.

According to the present invention, the cylindrical housing 21 has the hole formed at the center thereof and is made of a material like unplasticized polyvinyl chloride (uPVC), which is of course not limited thereto. The hole formed at the center of the housing 21 is a flow path along which the incoming water flows, so that while the incoming water is entering one side of the housing 21 and is being discharged to the other side of the housing 21, the ions of the incoming water are adsorbed or desorbed to or from the circular electrodes 22 and the intermediate electrodes 23.

According to the present invention, the pair of circular electrodes 22 has the hole formed at the center thereof and is disposed inside the cylindrical housing 21. In more detail, the circular electrodes are the outermost electrodes among the plurality of electrodes disposed in the housing 21 so that the intermediate electrodes 23 are disposed between the pair of circular electrodes 22. The holes formed at the centers of the circular electrodes 22 communicate with the hole of the housing 21 and function as the flow path of the incoming water. The circular electrodes 22 are formed of porous carbon electrodes having a large specific surface area and have active carbon layers formed on the surfaces facing each other. Further, the circular electrodes 22 have electrode portions formed on one side thereof in such a manner as to be connected to a DC power supply.

According to the present invention, the intermediate electrodes 23 are spaced apart from each other by a given distance between the pair of circular electrodes 22 and have the holes formed at the centers thereof. Basically, the intermediate electrodes 23 make use of the same electrodes as the pair of circular electrodes 22. Unlike the pair of outermost circular electrodes 22 disposed inside the housing 21, each intermediate electrode 23 has active carbon layers formed on both surfaces thereof and has electrode portions formed on one side thereof in such a manner as to be connected to the DC power supply or does not have any electrode portions formed thereon, which depends upon the operation (a bipolar or monopolar operation as will be discussed later) of the CDI electrode module.

According to the present invention, the CDI electrode module 20 may operate in a bipolar manner. Unlike the monopolar manner wherein the electrodes of the interior of the housing 21 are connected to the DC power supply and act as cathodes or anodes, the bipolar manner is configured herein only the pair of outermost circular electrodes 22 among the plurality of electrodes in the interior of the housing 21 is connected with the DC power supply in such a manner as to apply a positive potential to one side (a cathode) and to apply a negative potential to the other side (an anode), so that the positive potential is charged to one surface (cathode) of each intermediate electrode 23 disposed between the circular electrodes 22 and the negative potential is charged to the other surface (anode) thereof. When the adsorption and desorption processes are performed in the bipolar manner, the outermost circular electrodes 22 disposed inside the housing 21 are charged to the opposite electrodes to each other. That is, if one side of the pair of circular electrodes 22 acts as the cathode in the adsorption process, it acts as the anode in the desorption process, and contrarily, if one side of the pair of circular electrodes 22 acts as the anode in the adsorption process, it acts as the cathode in the desorption process.

According to the present invention, the number of intermediate electrodes 23 is plural, which is adjustable in accordance with the whole voltage applied from the DC power supply. That is, it is desirable that a voltage of 1.5 V or under is applied to the CDI electrode module 20 so as to inhibit the electrodes from being oxidized, and the number of intermediate electrodes 23 is adjusted according to the whole voltage applied to the CDI electrode module 20, so that the voltage of 1.5 V or under is applied to the CDI electrode module 20, thereby inhibiting the electrodes from being oxidized. If the CDI electrode module 20 operates in the bipolar manner, the electrode portions connected to the DC power supply are formed only on the pair of outermost circular electrodes 22 disposed inside the housing 21, so that there is no need to use any transformer for applying the voltage to each electrode, thereby saving the whole installation cost.

According to the present invention, on the other hand, the CDI electrode module 20 may operate in a monopolar manner. In this case, the intermediate electrodes 23 desirably have electrode portions connected to the DC power supply.

Figure 3:
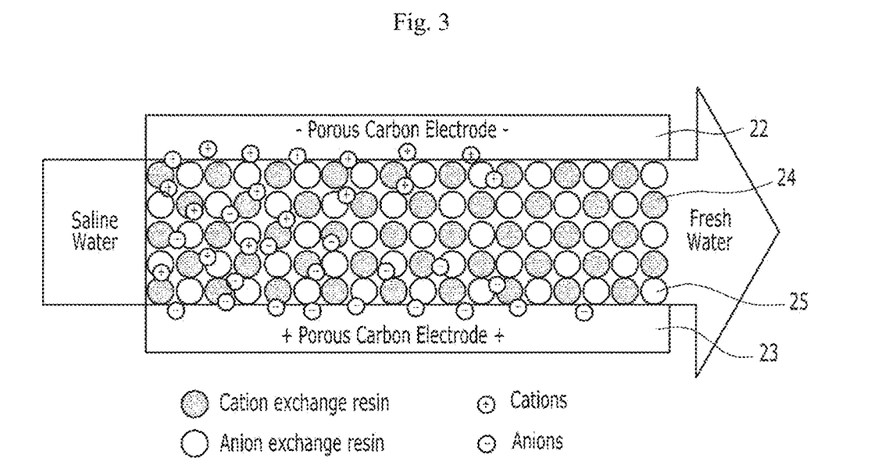
FIG. 3 is a schematic view showing the operation process of the capacitive deionization electrode module according to the present invention.
Figure 4:
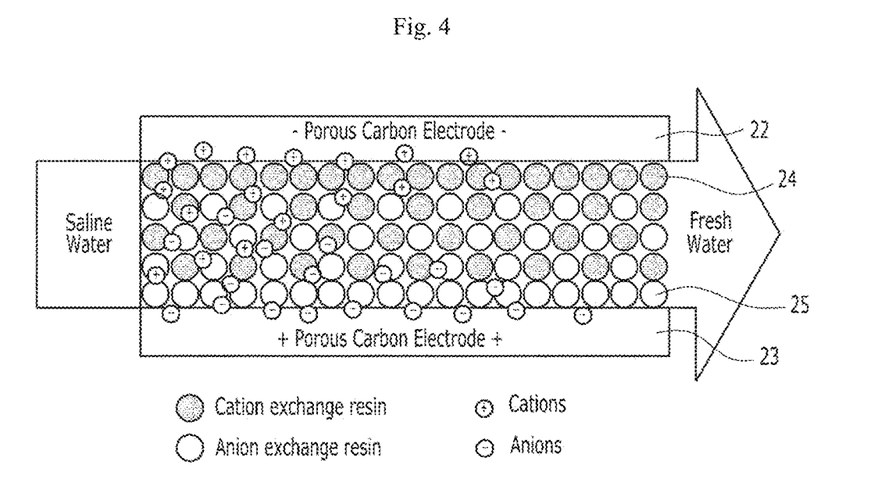
FIG. 4 is a schematic view showing the operation process of the capacitive deionization electrode module according to the present invention.

FIGS. 3 and 4 are schematic views showing the operation processes of the capacitive deionization electrode module according to the present invention. As shown in FIGS. 3 and 4, cation exchange resins 24 and anion exchange resins 25 are mixedly filled in the flow path between the respective electrodes of the CDI electrode module 20.

In case of the conventional CDI or MCDI electrode module, generally, the flow path is designed narrow to a range of 100 μm so as to increase a saline removal efficiency. However, the conventional CDI or MCDI electrode module may be likely to cause fouling due to the narrow flow path and may decrease the amount of incoming water treated. In addition, if one flow path is blocked due to such narrow flow paths, the whole system stops so that it is difficult to manufacture a large area CDI electrode module with a serial structure, which undesirably causes limitations in enhancing productivity such as large scale desalination and the like.

So as to maintain the saline removal efficiency as well as to inhibit the occurrence of fouling and the decrement in the amount of incoming water treated, according to the present invention, the flow path is expanded and at the same time the cation exchange resins 24 and the anion exchange resins 25 are mixedly filled in the flow path, while serving as a bridge, thereby reducing an electrical resistance in the flow path. That is, the flow path is expanded so that the fouling is suppressed and the amount of incoming water treated is increased, and at the same time, filling the cation exchange resins 24 and the anion exchange resins 25 in the flow path enhances the saline removal efficiency and further improves a saline removal speed upon the saline removal.

Furthermore, the present invention makes use of relatively low-priced ion exchange resins (currently about 900 dollar/ton), so that there is no need to use high-priced ion exchange membrane (currently about 90 dollar/m$^2$) which has been used to enhance the saline removal efficiency in the existing CDI apparatus, thereby drastically reducing capital expenditures.

At this time, the width of flow path formed between the electrodes may be freely designed if necessary, but so as to suppress the occurrence of fouling and to increase the amount of incoming water treated, desirably, the width of flow path is set to the range of 0.2 to 10 mm. If the width of flow path is less than 0.2 mm, fouling may be caused like the existing CDI electrode module, and contrarily, if the width of flow path is over 10 mm, the saline removal efficiency may be lowered.

According to the present invention, the cation exchange resins 24 and the anion exchange resins 25 filled in the flow path between the electrodes may have concentration gradients opposite to each other. That is, a relatively large number of cation exchange resins 24 are distributed to the anodes, and a relatively large number of anion exchange resins 25 are distributed to the cathodes (See FIG. 4). As a result, the adsorption efficiency at each electrode can be maximized, and when the adsorbed ions are desorbed, the desorbed ions can be rapidly discharged through the ion exchange resins and the flow rate.

Moreover, the cation change resins 24 and the anion exchange resins 25 are evenly distributed at the center of the flow path.

Figure 5:
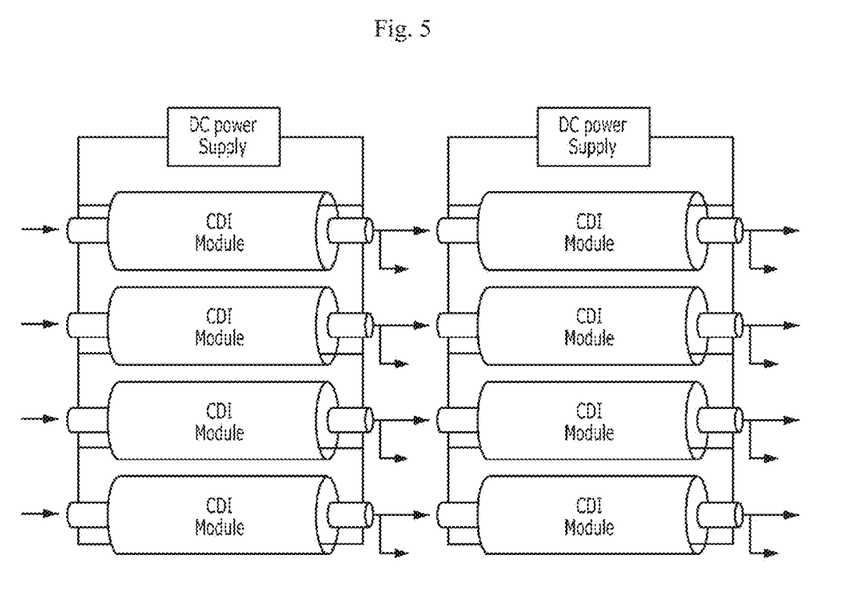
FIG. 5 is a schematic view showing the operations of serially connected capacitive deionization electrode modules according to the present invention.
Figure 6:
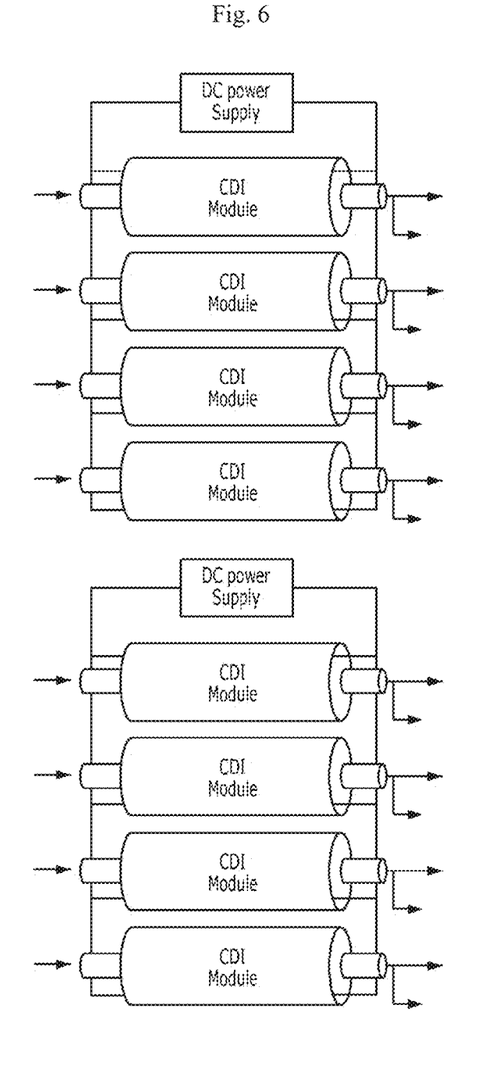
FIG. 6 is a schematic view showing the operations of parallel-connected capacitive deionization electrode modules according to the present invention.
Figure 7:
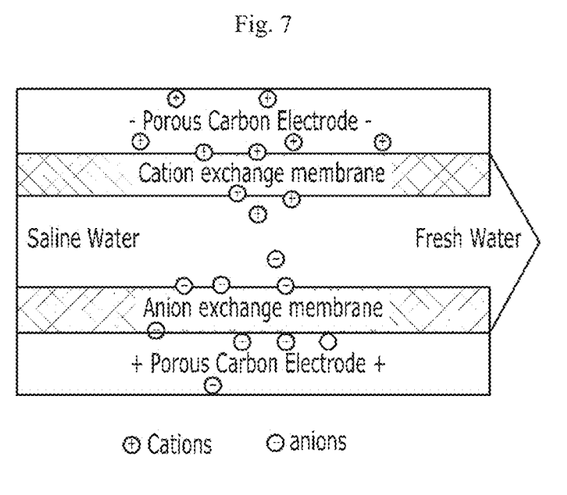
FIG. 7 is a schematic view showing an example of a conventional capacitive deionization electrode module using ion exchange membranes.

FIG. 5 is a schematic view showing the operations of serially connected capacitive deionization electrode modules according to the present invention, and FIG. 6 is a schematic view showing the operations of parallel-connected capacitive deionization electrode modules according to the present invention. According to the present invention, as shown in FIGS. 5 and 6, a plurality of CDI electrode modules 20 can be connected in serial or in parallel according to the purposes thereof. If Total Dissolved Solid (TDS) of incoming water is large (more than 3000 ppm), that is, the CDI electrode modules 20 are connected in serial, and if TDS is small (less than 3000 ppm), the CDI electrode modules 20 are connected in parallel. So as to reduce the pressure loss of feed flow, at this time, the CDI electrode modules 20 are desirably disposed below an angle of 0.5° with respect to their horizontal direction.

Next, an explanation on a water treatment apparatus using the CDI electrode module 20 will be given.

Figure 8:
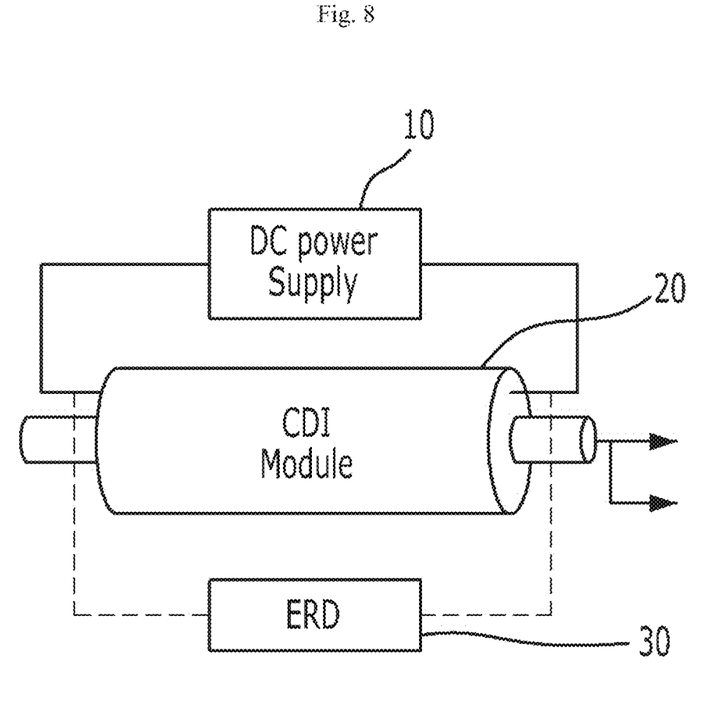
FIG. 8 is a schematic view showing a water treatment apparatus according to the present invention.

FIG. 8 is a schematic view showing a water treatment apparatus according to the present invention. As shown in FIG. 8, a water treatment apparatus according to the present invention includes: a DC power supply 10 adapted to apply a voltage to a CDI electrode module 20; the CDI electrode module 20 adapted to adsorb ions of incoming water thereto; and an energy recovery device (hereinafter, referred simply to as 'ERD') 30 adapted to recover energy generated when the ions adsorbed to the CDI electrode module 20 are desorbed. According to the present invention, the water treatment apparatus includes the ERD 30 adapted to recover and store the energy generated when the adsorbed ions during the operation of the CDI electrode module 20 are desorbed, thereby saving the energy consumed. In more detail, a maximum of 80% of the energy generated in the desorption process of the CDI electrode module 20 can be recovered and reused, thereby obtaining high energy saving effects.

Figure 9:
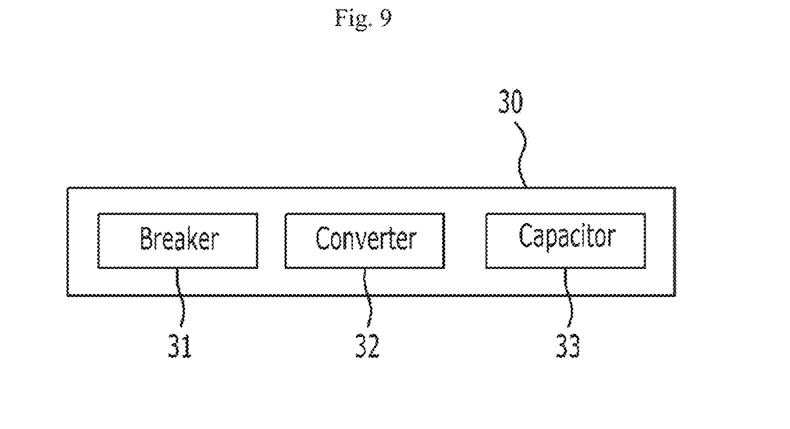
FIG. 9 is a schematic view showing an energy recovery device used in the water treatment apparatus according to the present invention.

FIG. 9 is a schematic view showing the energy recovery device used in the water treatment apparatus according to the present invention.

According to the present invention, the ERD 30 includes a breaker 31 adapted to change a direction of an electric current flowing in the CDI electrode module 20. Referring briefly to the CDI electrode module 20, if incoming water enters the CDI electrode module 20, the cations contained in the incoming water are adsorbed to anodes, and the anions contained therein to the cathodes. If they are sufficiently adsorbed, the adsorbed ions are removed through the desorption process. At this time, if the direction of the electric current flowing in the CDI electrode module 20 is changed by means of the breaker 31, that is, if cathodes are changed to anodes and anodes are changed to cathodes, the adsorbed ions have repulsive forces with respect to the changed electrodes, thereby being desorbed from each other.

According to the present invention, the ERD 30 includes a converter 32 adapted to recover the energy generated while the saline adsorbed to the CDI electrode module 20 is being desorbed. In more detail, the converter 32 is connected to energy saving means like a capacitor 33 as will be discussed later and serves to transfer energy between the CDI electrode module 20 and the capacitor 33. That is, the converter 32 recovers the energy generated during the desorption process (discharging) of the CDI electrode module 20 and transfers the recovered energy to the capacitor 33, so that the energy is stored in the capacitor 33, and further, the converter 32 transfers the stored energy in the capacitor 33 to the CDI electrode module 20 again so that the stored energy is used for the adsorption process (charging) of the CDI electrode module 20. The converter 32 can make use of a variety of converters known in the art.

According to the present invention, the ERD 30 includes the capacitor 33 adapted to store the recovered energy. In more detail, if the capacitor 33 receives the energy generated during the desorption process of the CDI electrode module 20 from the converter 32, it stores the energy and is used as an auxiliary DC power supply adapted to supply the stored energy again to allow the adsorption process to be performed later in the CDI electrode module 20. The capacitor 33 can make use of a variety of storing means known in the art, and desirably, it makes use of a large capacity electrochemical capacitor.

Figure 10:
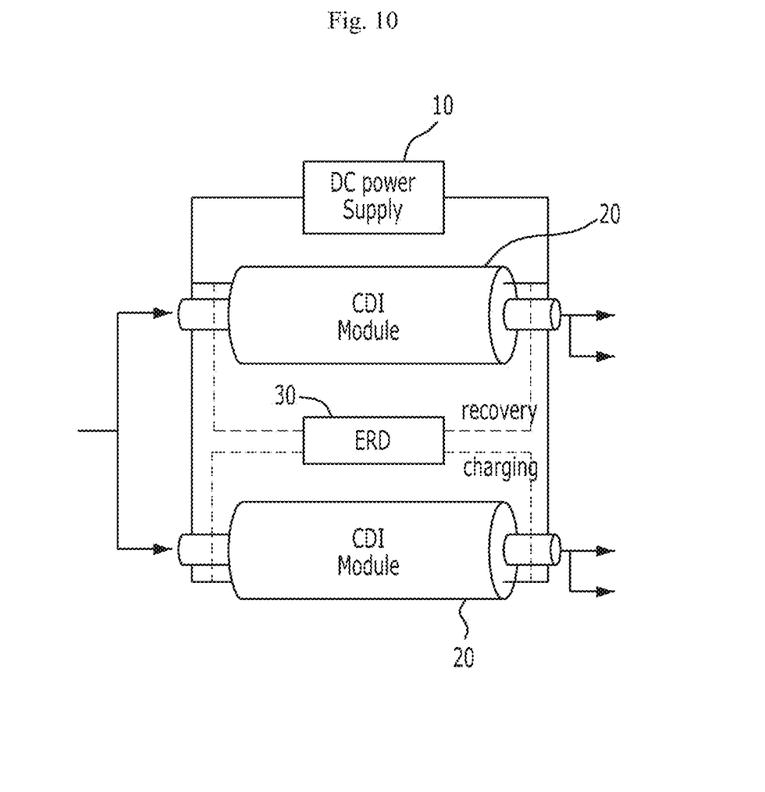
FIG. 10 is a schematic view showing the water treatment apparatus according to the present invention, wherein two CDI electrode modules are operated as one set.

FIG. 10 is a schematic view showing the water treatment apparatus according to the present invention, wherein two CDI electrode modules are operated as one set. As shown in FIG. 10, the water treatment apparatus according to the present invention includes two CDI electrode modules 20 as one set, and one ERD 30 is shared by one set of CDI electrode modules 20, so that the energy generated during the desorption (discharging) process of one side CDI electrode module 20 is recovered and stored, and after that, the stored energy is used for the adsorption (charging) process of the other side CDI electrode module 20.

Figure 11:
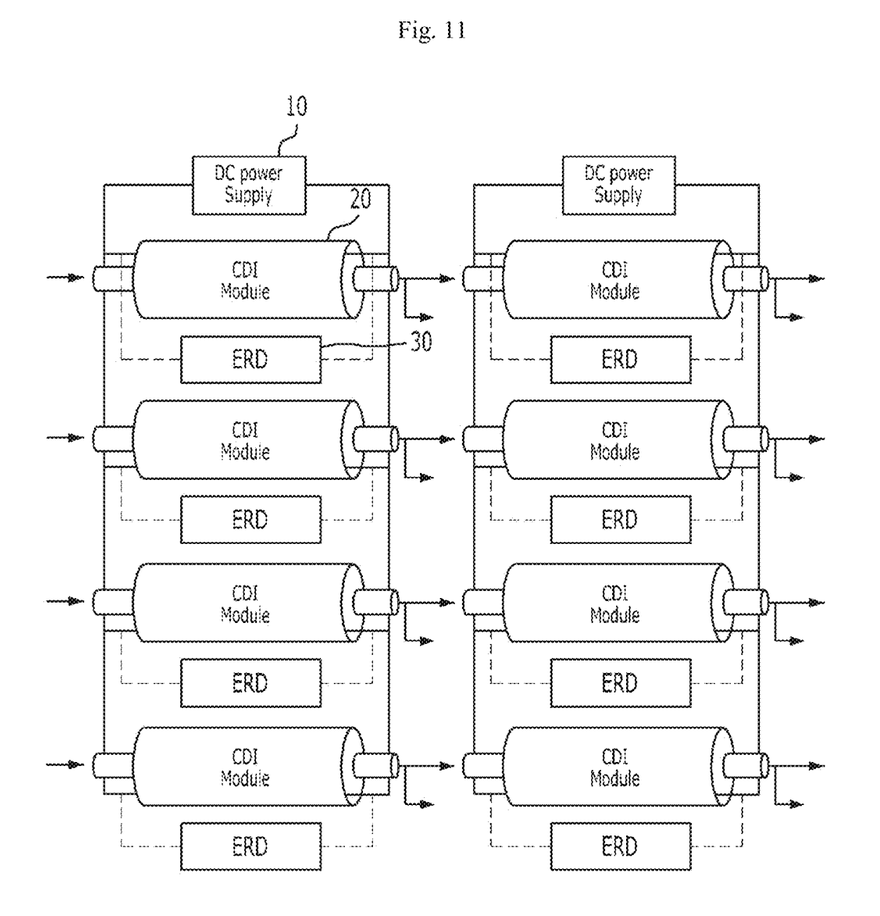
FIG. 11 is a schematic view showing the water treatment apparatus according to the present invention, wherein a plurality of CDI electrode modules are serially connected.
Figure 12:
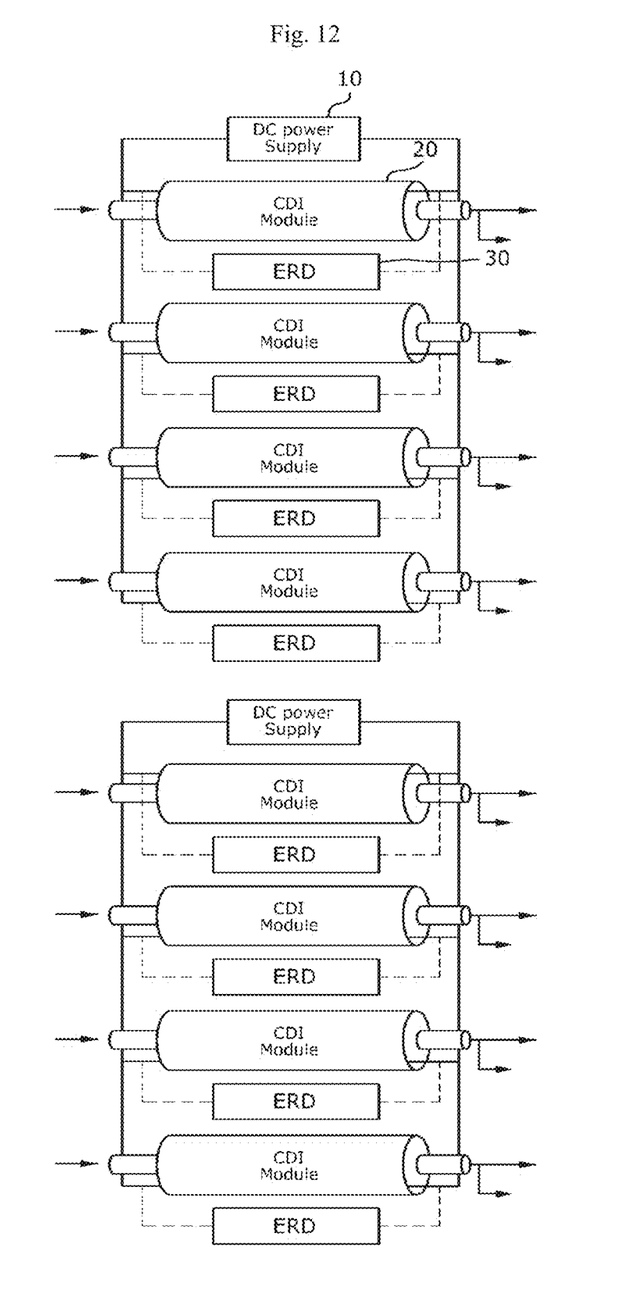
FIG. 12 is a schematic view showing the water treatment apparatus according to the present invention, wherein a plurality of CDI electrode modules are connected in parallel with each other.

FIG. 11 is a schematic view showing the water treatment apparatus according to the present invention, wherein a plurality of CDI electrode modules are serially connected, and FIG. 12 is a schematic view showing the water treatment apparatus according to the present invention, wherein a plurality of CDI electrode modules are connected in parallel. According to the present invention, a plurality of CDI electrode modules 20 can be connected in serial or in parallel in accordance with the purposes to be accomplished, and at this time, the ERD 30 is provided for each CDI electrode module 20. Otherwise, one ERD 30 is shared by the two CDI electrode modules 20. If Total Dissolved Solid (TDS) of incoming water is large (more than 3000 ppm), that is, the CDI electrode modules 20 are connected in serial, and if TDS is small (less than 3000 ppm), the CDI electrode modules 20 are connected in parallel. So as to reduce the pressure loss of feed flow, at this time, the CDI electrode modules 20 are desirably disposed below an angle of 0.5° with respect to their horizontal direction.

Hereinafter, the CDI electrode module 20 used in the water treatment apparatus according to the present invention will be in more detail explained with respect to FIGS. 2 to 4.

According to the present invention, the CDI electrode module 20 includes: a cylindrical housing 21 having a hole formed at the center thereof; a pair of circular electrodes 22 having a hole formed at the center thereof and circular intermediate electrodes 23 spaced apart from each other by a given distance between the pair of circular electrodes 22 and each having a hole formed at the center thereof. So as to improve the capacity of incoming water treated, at this time, the circular electrodes 22 disposed inside the housing 21 and the intermediate electrodes 23 disposed between the circular electrodes 22 desirably have a diameter in a range of 30 to 40 cm.

Most of conventional CDI electrode modules have square-shaped electrodes, and the sizes of the electrodes generally have 1.0 cm×10 cm. In this case, the capacity of incoming water treated is just 2.5 ton/day. Further, no deionization occurs on the edges of the square-shaped electrodes, and furthermore, corrosion (oxidation of electrodes) occurs thereon to lower the deionization efficiency. According to the present invention, however, the CDI electrode module makes use of the circular electrodes having the diameter of 30 cm to 40 cm, so that it is easy to laminate the electrodes, deionization occurs evenly on the entire electrode to improve the deionization efficiency per unit area, and the capacity of incoming water treated is more increased by 10 times than that of the conventional CDI electrode module having the square-shaped electrodes. Further, the occurrence of oxidation on the edges of the square-shaped electrodes is inhibited, thereby improving the durability of the CDI electrode module.

According to the present invention, the cylindrical housing 21 has the hole formed at the center thereof and is made of a material like unplasticized polyvinyl chloride (uPVC), which is of course not limited thereto. The hole formed at the center of the housing 21 is a flow path along which the incoming water flows, so that while the incoming water is entering one side of the housing 21 and is being discharged to the other side of the housing 21, the ions of the incoming water are adsorbed or desorbed to or from the circular electrodes 22 and the intermediate electrodes 23.

According to the present invention, the pair of circular electrodes 22 has the hole formed at the center thereof and is disposed inside the cylindrical housing 21. In more detail, the circular electrodes 22 are the outermost electrodes among the plurality of electrodes disposed in the housing 21 so that the intermediate electrodes 23 are disposed between the pair of circular electrodes 22. The holes formed at the centers of the circular electrodes 22 communicate with the hole of the housing 21 and function as the flow path of the incoming water. The circular electrodes 22 are formed of porous carbon electrodes having a large specific surface area and have active carbon layers formed on the surfaces facing each other. Further, the circular electrodes 22 have electrode portions formed on one side thereof in such a manner as to be connected to the DC power supply 10.

According to the present invention, the intermediate electrodes 23 are spaced apart from each other by a given distance between the pair of circular electrodes 22 and have the holes formed at the centers thereof. Basically, the intermediate electrodes 23 make use of the same electrodes as the pair of circular electrodes 22. Unlike the pair of outermost circular electrodes 22 disposed inside the housing 21, each intermediate electrode 23 has active carbon layers formed on both surfaces thereof and has electrode portions formed on one side thereof in such a manner as to be connected to the DC power supply 10 or does not have any electrode portions formed thereon, which depends upon the operation (a bipolar or monopolar operation as will be discussed later) of the CDI electrode module.

According to the present invention, the CDI electrode module 20 may operate in a bipolar manner. Unlike the monopolar manner wherein the electrodes of the interior of the housing 21 are connected to the DC power supply and act as cathodes or anodes, the bipolar manner is configured wherein only the pair of outermost circular electrodes 22 among the plurality of electrodes in the interior of the housing 21 is connected with the DC power supply 10 in such a manner as to apply a positive potential to one side (a cathode) and to apply a negative potential to the other side (an anode), so that the positive potential is charged to one surface (cathode) of each intermediate electrode 23 disposed between the circular electrodes 22 and the negative potential is charged to the other surface (anode) thereof. When the adsorption and desorption processes are performed in the bipolar manner, the outermost circular electrodes 22 disposed inside the housing 21 are charged to the opposite electrodes to each other. That is, if one side of the pair of circular electrodes 22 acts as the cathode in the adsorption process, it acts as the anode in the desorption process, and contrarily, if one side of the pair of circular electrodes 22 acts as the anode in the adsorption process, it acts as the cathode in the desorption process.

According to the present invention, the number of intermediate electrodes 23 is plural, which is adjustable in accordance with the whole voltage applied from the DC power supply 10. That is, it is desirable that a voltage of 1.5 V or under is applied to the CDI electrode module 20 so as to inhibit the electrodes from being oxidized, and the number of intermediate electrodes 23 is adjusted according to the whole voltage applied to the CDI electrode module 20, so that the voltage of 1.5 V or under is applied to the CDI electrode module 20, thereby inhibiting the electrodes from being oxidized. If the CDI electrode module 20 operates in the bipolar manner, the electrode portions connected to the DC power supply 10 are formed only on the pair of outermost circular electrodes 22 disposed inside the housing 21, so that there is no need to use any transformer for applying the voltage to each electrode, thereby saving the whole installation cost.

According to the present invention, on the other hand, the CDI electrode module 20 may operate in a monopolar manner. In this case, the intermediate electrodes 23 desirably have electrode portions connected to the DC power supply 10.

FIGS. 3 and 4 are schematic views showing the operation processes of the capacitive deionization electrode module according to the present invention. As shown in FIGS. 3 and 4, the cation exchange resins 24 and the anion exchange resins 25 are mixedly filled in the flow path between the respective electrodes of the CDI electrode module 20.

In case of the conventional CDI or electrode module, generally, the flow path is designed narrow to a range of 100 μm so as to increase a saline removal efficiency. However, the conventional CM or MCDI electrode module may be likely to cause fouling due to the narrow flow path and may decrease the amount of incoming water treated. In addition, if one flow path is blocked due to such narrow flow paths, the whole system stops so that it is difficult to manufacture a large area CDI electrode module with a serial structure, which undesirably causes limitations in enhancing productivity such as large scale desalination and the like.

So as to maintain the saline removal efficiency as well as to inhibit the occurrence of fouling and the decrement in the amount of incoming water treated, according to the present invention, the flow path is expanded and at the same time the cation exchange resins 24 and the anion exchange resins 25 are mixedly filled in the flow path, while serving as a bridge, thereby reducing an electrical resistance in the flow path. That is, the flow path is expanded so that the fouling is suppressed and the amount of incoming water treated is increased, and at the same time, filling the cation exchange resins 24 and the anion exchange resins 25 in the flow path enhances the saline removal efficiency and further improves a saline removal speed upon the saline removal.

Furthermore, the present invention makes use of relatively low-priced ion exchange resins (currently about 900 dollar/ton), so that there is no need to use high-priced ion exchange membrane (currently about 90 dollar/$m^2$) which has been used to enhance the saline removal efficiency in the existing CDI apparatus, thereby drastically reducing capital expenditures.

At this time, the width of flow path formed between the electrodes may be freely designed if necessary, but so as to suppress the occurrence of fouling and to increase the amount of incoming water treated, desirably, the width of flow path is set to the range of 0.2 mm to 10 mm. If the width of flow path is less than 0.2 mm, fouling may be caused like the existing CDI electrode module, and contrarily, if the width of flow path is over 10 mm, the saline removal efficiency may be lowered.

According to the present invention, the cation exchange resins 24 and the anion exchange resins 25 filled in the flow path between the electrodes may have concentration gradients opposite to each other. That is, a relatively large number of cation exchange resins 24 are distributed to the anodes, and a relatively large number of anion exchange resins 25 are distributed to the cathodes (See FIG. 4). As a result, the adsorption efficiency at each electrode can be maximized, and when the adsorbed ions are desorbed, the desorbed ions can be rapidly discharged through the ion exchange resins and the flow rate. Moreover, the cation exchange resins 24 and the anion exchange resins 25 are evenly distributed at the center of the flow path.

Next, a water treatment method capable of saving energy according to the present invention will be explained. For the convenience of the explanation, the water treatment method will be carried out using the water treatment apparatus as mentioned above, but it is not limited thereto. Also, an explanation on the repeated contents will be avoided for the brevity of the description.

According to the present invention, a water treatment method S100 includes: a power supply step S10 wherein a voltage is applied to a CDI electrode module 20; an adsorption step S20 wherein ions of incoming water are adsorbed to the CDI electrode module 20; and an energy recovery step S30 wherein energy generated when the ions adsorbed to the CDI electrode module 20 are desorbed is recovered. According to the present invention, the water treatment method S100 includes the energy recovery step S30 of recovering and storing the energy generated when the adsorbed ions during the operation of the CDI electrode module 20 are desorbed, thereby reusing the stored energy to save the energy consumed. In more detail, as much as 80% of the energy generated in the desorption process of the CDI electrode module 20 can be recovered and reused, thereby obtaining high energy saving effects.

According to the present invention, at the power supply step S10, the voltage is applied to the CDI electrode module 20, which is carried out by means of a power supply known in the art. When the voltage is applied at the power supply step S10, a bipolar or monopolar system may be adopted. That is, the voltage may be applied only to the outermost electrodes in the CDI electrode module 20, and otherwise, the voltage may be applied to the respective electrodes in the CDI electrode modules 20.

According to the present invention, at the adsorption step S20, the ions of the incoming water are adsorbed to the CDI electrode module 20, which is carried out by means of a CDI electrode module adsorption principle known in the art. That is, if the respective electrodes of the CDI electrode module 20 act as cathodes or anodes through the application of the voltage thereto, the cations in the incoming water are adsorbed to the anodes, while the anions in the incoming water are being adsorbed to the cations.

According to the present invention, the energy recovery step S30 includes a breaking step S31 of changing a direction of an electric current flowing in the CDI electrode module 20. In more detail, at the adsorption step S20, the cations contained in the incoming water are adsorbed to the anodes, and the anions contained therein to the cathodes. If they are sufficiently adsorbed, the adsorbed ions are desorbed. So as to desorb the adsorbed ions to the CDI electrode module 20, at this time, the direction of the electric current flowing in the CDI electrode module 20 is changed. That is, the cathodes are changed to the anodes, and the anodes are changed to the cathodes.

According to the present invention, the energy recovery step S30 includes an energy transfer step S32 of recovering the energy generated while the saline adsorbed to the CDI electrode module 20 is being desorbed and transferring the recovered energy to a capacitor 33. To this end, there is provided a converter 32 that is connected to energy saving means like the capacitor 33 and serves to transfer energy between the CDI electrode module 20 and the capacitor 33. That is, the converter 32 recovers the energy generated during the discharging (desorption) process of the CDI electrode module 20 and transfers the recovered energy to the capacitor 33, so that the energy is stored in the capacitor 33, and further, the converter 32 transfers the stored energy in the capacitor 33 to the CDI electrode module 20 again so that the stored energy is used for the charging (adsorption) process of the CDI electrode module 20.

According to the present invention, the energy recovery step S30 includes an energy storage step S33 of storing the recovered energy in the capacitor 33. To this end, the capacitor 33 makes use of a variety of storing means known in the art, and desirably, it makes use of a large capacity electrochemical capacitor. Further, the energy recovery step S30 includes the energy reuse step S34 of transferring the stored energy to the CDI electrode module 20 after the energy storage step S33 to allow the stored energy to be reused for the charging process of the CDI electrode module 20.

As set forth in the foregoing, the CDI electrode module according to the present invention makes use of the circular electrodes so that the occurrence of corrosion (oxidation of electrodes) can be inhibited to improve the durability of the CDI electrode module.

In addition, the CDI electrode module according to the present invention is configured to allow potentials to be applied to only the pair of outermost circular electrodes disposed inside the housing, so that there is no need to use any transformer for applying the potentials to each electrode in the conventional practice, thereby saving the whole installation cost.

Also, the CDI electrode module according to the present invention makes use of the electrodes having large diameters and expands the flow path between the electrodes so that fouling is minimized and the amount of incoming water treated is increased.

Further, the CDI electrode module according to the present invention is operated in a large area of serial or parallel structure and does not need to use any ion exchange membrane, thereby drastically reducing capital expenditures.

Furthermore, the water treatment apparatus or method according to the present invention can recover the energy generated while the adsorbed saline is being desorbed through the energy recovery device or the energy recovery step and reuse the recovered energy for the ion adsorption process, thereby saving the energy consumed in the operation thereof.

At this time, the CDI electrode module makes use of the circular electrodes so that the occurrence of corrosion (oxidation of electrodes) can be prevented to improve the durability of the CDI electrode module. Further, the CDI electrode module is configured to allow potentials to be applied to only the pair of outermost circular electrodes disposed inside the housing, so that there is no need to use any transformer for applying the potentials to each electrode in the conventional practice, thereby saving the whole installation cost. Furthermore, the CDI electrode module makes use of the electrodes having large diameters and expands the flow path between the electrodes so that fouling is minimized and the amount of incoming water treated is increased. Also, the CDI electrode module is operated in a large area of serial or parallel structure and does not need to use any ion exchange membrane, thereby drastically reducing capital expenditures.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A capacitive deionization electrode module comprising:
   a housing having a circular cylindrical shape and a center axis, the housing including a circular face disposed at each end of the housing and an end face hole formed at the center of each circular face;
   a pair of circular electrodes disposed inside the housing, each of the pair of circular electrodes having a diameter of 30 to 40 cm and a first hole formed at the center of a corresponding circular electrode of the pair of circular electrodes; and
   a plurality of circular intermediate electrodes disposed inside the housing and spaced apart from each other and from each of the pair of circular electrodes, each of the plurality of circular intermediate electrodes having a diameter of 30 to 40 cm and a second hole formed at the center of a corresponding circular intermediate electrode of the plurality of circular intermediate electrodes,
   wherein the end face holes, the first holes, and the second holes are arranged linearly along the center axis of the housing and communicate with each other to form a linear flow passage through the housing, the pair of circular electrodes, and the plurality of circular intermediate electrodes,
   wherein each of the end face holes, the first holes, and the second holes has a center aligned with the center axis of the housing and includes an inner circumferential surface that is concentric with the center axis of the housing and forms a part of the linear flow passage, the respective inner circumferential surfaces being formed an equal distance from the center axis of the housing such that the end face holes, the first holes, and the second holes have equal diameters and such that the inner circumferential surfaces of the respective parts of the linear flow passage are aligned with each other in an axial direction of the housing, wherein the housing is configured to pass incoming water along the linear flow passage formed by the end face holes, the first holes, and the second holes, wherein the linear flow passage is mixedly filled with cation exchange resins and anion exchange resins to reduce an electrical resistance through the linear flow passage, wherein the plurality of circular intermediate electrodes are arranged in a housing space defined by the pair of circular electrodes and are spaced apart within the housing space to form a plurality of gaps respectively interposed between adjacent pairs of the plurality of circular intermediate electrodes, each of the plurality of gaps forming a plenum having a given axial distance and enabling formation of an expanded flow path between the respective electrodes of the plurality of circular intermediate electrodes, and wherein each plenum formed by the plurality of gaps includes
a radially inner portion that extends radially from the center axis to the inner diameter of the linear flow passage and
a radially outer portion, as the expanded flow path, that extends radially from the inner diameter of the linear flow passage to the inner diameter of the housing.

2. The capacitive deionization electrode module according to claim 1,
wherein the pair of circular electrodes includes a first circular electrode and a second circular electrode; and
wherein each of the pair of circular electrodes includes:
a porous carbon electrode having an axially outward facing side that faces the housing and an axially inward facing side that faces one of the first circular electrode and the second circular electrode,
an electrode portion that is formed on only one side of the porous carbon electrode and is configured to be connected to a DC power supply, and
an active carbon layer formed on only the axially inward facing side.

3. The capacitive deionization electrode module according to claim 1, wherein each of the plurality of circular intermediate electrodes includes:
a porous carbon electrode having a first axially facing side that faces in a first direction and a second axially facing side that faces in a second direction opposite to the first direction;
an electrode portion that is formed on only one side of the porous carbon electrode and is configured to be connected to a DC power supply; and
an active carbon layer formed on each of the first and second axially facing sides of the porous carbon electrode.

4. The capacitive deionization electrode module according to claim 1, further comprising:
a DC power supply of 1.5 V or less that is connected across the pair of circular electrodes and is connected to only the pair of circular electrodes;
a module cathode formed by one of the pair of circular electrodes and disposed on a first side of the cylindrical housing; and
a module anode formed by the other of the pair of circular electrodes and disposed on a second side of the cylindrical housing opposite to the first side.

5. The capacitive deionization electrode module according to claim 4,
wherein the plurality of circular intermediate electrodes includes a number of circular intermediate electrodes, the number determined by the voltage of the DC power supply; and
wherein each of the plurality of circular intermediate electrodes has a cathode formed on a first axially facing surface and an anode formed on a second axially facing surface opposite to the first axially facing surface.

* * * * *